(12) United States Patent
Tabuchi et al.

(10) Patent No.: US 6,529,452 B2  
(45) Date of Patent: Mar. 4, 2003

(54) RECORDING/REPRODUCING DEVICE AND RECORDING/REPRODUCING METHOD

(75) Inventors: Tatsuhito Tabuchi, Chiba (JP); Naokazu Ohta, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/808,163

(22) Filed: Mar. 14, 2001

(65) Prior Publication Data

US 2001/0030918 A1 Oct. 18, 2001

(30) Foreign Application Priority Data

Mar. 17, 2000 (JP) ........................................ 2000-076823  
Feb. 13, 2001 (JP) ........................................ 2001-035540

(51) Int. Cl.[7] .............................................. G11B 17/22  
(52) U.S. Cl. ............................. 369/30.05; 369/47.12; 369/84  
(58) Field of Search ........................... 369/30.05, 30.19, 369/47.12, 47.13, 47.11, 53.2, 53.29, 53.41, 83, 84, 85; 360/13, 15

(56) References Cited

U.S. PATENT DOCUMENTS 5,751,678 A * 5/1998 Tanaka ......................... 369/84  
5,790,499 A * 8/1998 Itoh ............................. 369/84  
6,034,832 A * 3/2000 Ichimura et al. .............. 360/60

* cited by examiner

Primary Examiner—Paul W. Huber  
(74) Attorney, Agent, or Firm—Jay H. Maioli

(57) ABSTRACT

A recording/reproducing device and a recording/reproducing method for recording a program reproduced from a first recording medium onto a second recording medium having at least two recording regions and onto a third recording medium in synchronism. The recording region may be changed over on the second recording medium. In this case, after the change-over of the recording region of the second recording medium has been completed, the head of the program reproduced from the first recording medium when the change-over of the recording region occurred is recorded onto the second recording medium and into the third recording medium, and the program that was incompletely recorded into the third recording medium is erased after the recording. Therefore, the program that had been recorded during the change-over of the recording region of the second recording medium is completely recorded, and the program is further completely recorded into the third recording medium.

20 Claims, 13 Drawing Sheets

FIG. 3

| | 16bit | | 16bit | | |
|---|---|---|---|---|---|
| | MSB    LSB | MSB    LSB | MSB    LSB | MSB    LSB | |
| Header { | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | Cluster H | Cluster L | Sector | 00000010 | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker cord | Model cord | First TNO | Last TNO | 7 |
| | 00000000 | 00000000 | 00000000 | Used Secters | 8 |
| | 00000000 | 00000000 | 00000000 | 00000000 | 9 |
| | 00000000 | 00000000 | 00000000 | Disk Serial No | 10 |
| Corresponding Table-Designating Data Unit { | Disk | ID | F-DFA | P-EMPTY | 11 |
| | P-FRA | P-TN01 | P-TN02 | P-TN03 | 12 |
| | P-TN04 | P-TN05 | P-TN06 | P-TN07 | 13 |
| | P-TN0248 | P-TN0249 | P-TN0250 | P-TMN0251 | 74 |
| | P-TN0252 | P-TN0253 | P-TN0254 | P-TN0255 | 75 |
| | 00000000 | 00000000 | 00000000 | 00000000 | 76 |
| | 00000000 | 00000000 | 00000000 | 00000000 | 77 |
| (01h) | Start Address | | | Track Mode | 78 |
| | End Address | | | Link Data | 79 |
| (02h) | Start Address | | | Track Mode | 80 |
| | End Address | | | Link Data | 81 |
| (03h) | Start Address | | | Track Mode | 82 |
| | End Address | | | Link Data | 83 |
| Management Table Unit (255 Slots) (FCh) | Start Address | | | Track Mode | 580 |
| | End Address | | | Link Data | 581 |
| (FDh) | Start Address | | | Track Mode | 582 |
| | End Address | | | Link Data | 583 |
| (FEh) | Start Address | | | Track Mode | 584 |
| | End Address | | | Link Data | 585 |
| (FFh) | Start Address | | | Track Mode | 586 |
| | End Address | | | Link Data | 587 |

FIG. 4
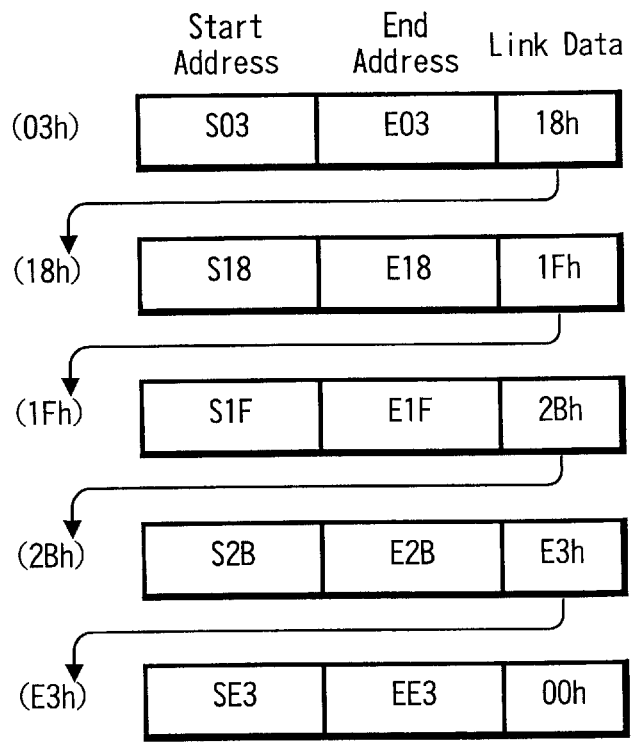
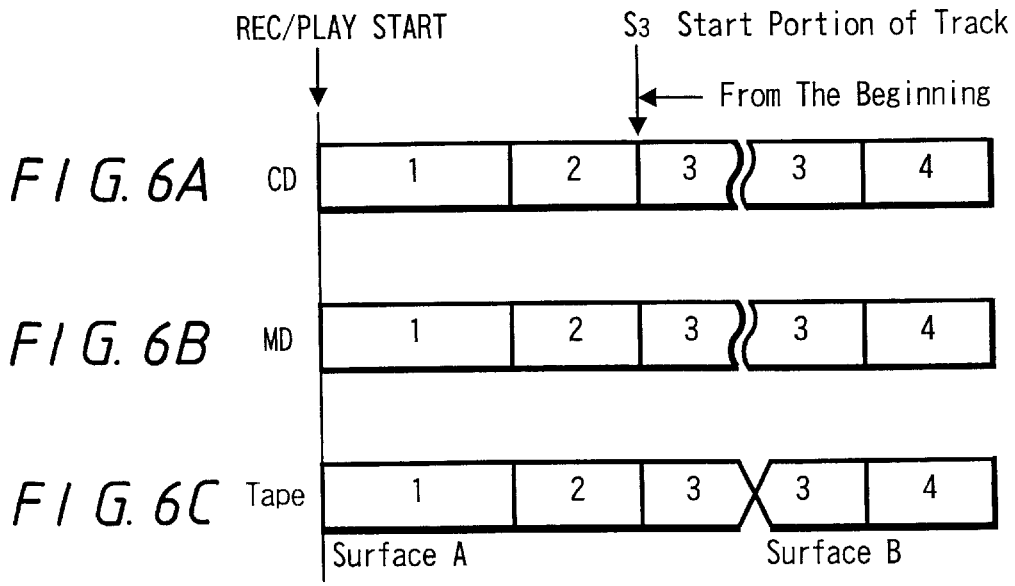
FIG. 6A CD
FIG. 6B MD
FIG. 6C Tape

FIG. 7A
CD to be Recorded

⟨CD⟩ Total Number of Tracks:5    Total Time 25:00

| Track1 | Track2 | Track3 | Track4 | Track5 |
|--------|--------|--------|--------|--------|
| 5:00   | 5:00   | 5:00   | 5:00   | 5:00   |

FIG. 7B
Actual Order of Play of CD

⟨CD⟩    Play Time 28:00

| Track1 | Track2 | Track3 | Track4 | Track5 |
|--------|--------|--------|--------|--------|
| 5:00   | 5:00   | 5:00   | 5:00   | 3:00   |

| Track5 |
|--------|
| 5:00   |

FIG. 7D
MD after Recorded

⟨MD⟩ Total Number of Tracks:5    Used Recording Areas 25:00

| Track1 | Track2 | Track3 | Track4 | Track5 | Unrecorded Area |
|--------|--------|--------|--------|--------|-----------------|
| 5:00   | 5:00   | 5:00   | 5:00   | 5:00   |                 |

FIG. 7D
Tape after Recorded

⟨Tape⟩ 46 Min (One Side,23 Min)    Surface A

| Track1 | Track2 | Track3 | Track4 | Track5 |
|--------|--------|--------|--------|--------|
| 5:00   | 5:00   | 5:00   | 5:00   | 3:00   |

Surface B

| Track5 | Unrecorded Area |
|--------|-----------------|
| 5:00   |                 |

FIG. 8A
Reproduction of CD

Program#1 | #2-A | (#2-A) #2 (#2-B)

FIG. 8B
Recording of Cassette Tape

Program#1 | #2-A | Program#2

Reversed

FIG. 8C
Recording of MD Addresses

000 | Program#1 | 090 091 #2-A 098 099 | Program#2 | 136

FIG. 9

Correspondence Table-Designating Data Portion (Table Pointers)

| P-DFA: | — | P-EMPTY: | 02h | P-FRA: | 01h |
|---|---|---|---|---|---|
| P-TN01: | — | P-TN02: | — | P-TN03: | — |
| P-TN04: | — | P-TN05: | — | P-TN06: | — |
| P-TN07: | — | P-TN08: | — | P-TN09: | — |

| P-TN0253: | — | P-TN0254: | — | P-TN0255: | — |
|---|---|---|---|---|---|

Management Table-Designating Data Portion (255 Parts Table)

| | Start Address | End Address | Link Data |
|---|---|---|---|
| (01h) | 000 | 399 | — |
| (02h) | — | — | 03h |
| (03h) | — | — | 04h |
| (04h) | — | — | 05h |
| (05h) | — | — | 06h |
| (06h) | — | — | 07h |
| (07h) | — | — | 08h |
| (08h) | — | — | 09h |
| (09h) | — | — | 0Ah |
| (0Ah) | — | — | 0Bh |
| (0Bh) | — | — | 0Ch |
| (FEh) | — | — | FFh |
| (FFh) | — | — | — |

FIG. 10

Correspondence Table-Designating Data Portion (Table Pointers)

| P-DFA: — | P-EMPTY: 03h | P-FRA: 01h |
|---|---|---|
| P-TN01: 02h | P-TN02: — | P-TN03: — |
| P-TN04: — | P-TN05: — | P-TN06: — |
| P-TN07: — | P-TN08: — | P-TN09: — |
| P-TN0253: — | P-TN0254: — | P-TN0255: — |

Management Table-Designating Data Portion (255 Parts Table)

|   | Start Address | End Address | Link Data |
|---|---|---|---|
| (01h) | 091 | 399 | — |
| (02h) | 000 | 090 | — |
| (03h) | — | — | 04h |
| (04h) | — | — | 05h |
| (05h) | — | — | 06h |
| (06h) | — | — | 07h |
| (07h) | — | — | 08h |
| (08h) | — | — | 09h |
| (09h) | — | — | 0Ah |
| (0Ah) | — | — | 0Bh |
| (0Bh) | — | — | 0Ch |
| (FEh) | — | — | FFh |
| (FFh) | — | — | — |

FIG. 11

Correspondence Table-Designating Data Portion (Table Pointers)

| P-DFA: — | P-EMPTY: 05h | P-FRA: 01h |
|---|---|---|
| P-TN01: 02h | P-TN02: 03h | P-TN03: 04h |
| P-TN04: — | P-TN05: — | P-TN06: — |
| P-TN07: — | P-TN08: — | P-TN09: — |
| P-TN0253: — | P-TN0254: — | P-TN0255: — |

Management Table-Designating Data Portion (255 Parts Table)

| | Start Address | End Address | | Link Data |
|---|---|---|---|---|
| (01h) | 137 | 399 | | — |
| (02h) | 000 | 090 | | — |
| (03h) | 091 | 098 | | — |
| (04h) | 099 | 136 | | — |
| (05h) | — | — | | 06h |
| (06h) | — | — | | 07h |
| (07h) | — | — | | 08h |
| (08h) | — | — | | 09h |
| (09h) | — | — | | 0Ah |
| (0Ah) | — | — | | 0Bh |
| (0Bh) | — | — | | 0Ch |
| (FEh) | — | — | | FFh |
| (FFh) | — | — | | — |

FIG. 12

Correspondence Table-Designating Data Portion (Table Pointers)

| P-DFA: — | P-EMPTY: 05h | P-FRA: 01h |
|---|---|---|
| P-TN01: 02h | P-TN02: 04h | P-TN03: — |
| P-TN04: — | P-TN05: — | P-TN06: — |
| P-TN07: — | P-TN08: — | P-TN09: — |
| P-TN0253: — | P-TN0254: — | P-TN0255: — |

Management Table-Designating Data Portion (255 Parts Table)

| | Start Address | End Address | Link Data |
|---|---|---|---|
| (01h) | 137 | 399 | 03h |
| (02h) | 000 | 090 | — |
| (03h) | 091 | 098 | — |
| (04h) | 099 | 136 | — |
| (05h) | — | — | 06h |
| (06h) | — | — | 07h |
| (07h) | — | — | 08h |
| (08h) | — | — | 09h |
| (09h) | — | — | 0Ah |
| (0Ah) | — | — | 0Bh |
| (0Bh) | — | — | 0Ch |
| (FEh) | — | — | FFh |
| (FFh) | — | — | — |

RECORDING/REPRODUCING DEVICE AND RECORDING/REPRODUCING METHOD

BACKGROUND OF THE INVENTION

1. Field of the Invention

The present invention relates to a recording/reproducing device which, in dubbing a program reproduced from a first recording medium into a second recording medium having at least two recording regions and into a third recording medium in synchronism, makes it possible to accomplish the recording into the second recording medium and into the third recording medium without interruption in the recording even when the recording region is changed over in the second recording medium.

2. Description of the Related Art

CD players which are devices capable of reproducing CDs (compact discs) have now been widely used. There have further been widely used disc media capable of recording and reproducing audio data, such as mini-discs (MDs) (trade name), and recording/reproducing devices adapted to these disc media. There have also been widely used audio systems by combining an MD recorder/player which is a recording/reproducing device adapted to MDs, a CD player and a cassette tape recorder/player.

In the systems such as the MD recorder/player and the CD player, the audio data are managed in a unit of a so-called "program". The program referred to in this specification stands for a data group that is managed and recorded as a unit on the disc, as represented by, for example, a tune and, generally, a "track" in the case of audio data.

The above audio systems have generally been so constructed as to execute the so-called dubbing by recording the audio data reproduced by a CD player into an MD and a tape simultaneously by using an MD recorder/player and a cassette tape recorder/player. There has further been proposed a system constituted to execute the so-called high-speed dubbing to accomplish the recording in a decreased period of time.

In the high-speed dubbing, a disc revolution control system and a reproduced signal processing system in the CD player are so controlled as to reproduce the CD at a predetermined multiplied speed which is faster than a normal reproducing speed which has not been multiplied. In the MD recorder/player and in the cassette tape recorder/player, too, the recorded signal processing system is controlled so as to operate at a multiplied speed to meet the multiplied speed for reproducing the CD, and the audio data reproduced by the CD player are input and are recorded into the MD and into the cassette tape. In a device of a combination of, for example, a CD player which is a reproducing device, an MD recorder/player and a cassette tape recorder/player which are recording devices, it is easy to simultaneously operate the CD player, the MD recorder/player and the cassette tape recorder/player at a predetermined multiplied speed for high-speed dubbing. Even in a system comprising a reproducing device and plural separate recording devices, the operations of the reproducing device and of the plural recording devices can be controlled in synchronism to easily realize a low-speed dubbing or a high-speed dubbing provided the communication is accomplished among them by using, for example, cables for control operation.

Considered below is a case where a first recording medium which may be a CD is reproduced by the CD player, a second recording medium which may be a tape is dubbed by the cassette tape recorder/player and a third recording medium which may be an MD is dubbed by the MD recorder/player, simultaneously, by using the above-mentioned recording/reproducing device and the recording/reproducing method. Namely, the data are normally recorded when there is used an MD which is the third recording medium having a recording capacity equal to, or greater than, the recording capacity of the CD which is the first recording medium. In the case of the cassette tape which is the second recording medium in which a leader tape and an end tape are stuck to the leading part and the end part of the recording medium, however, the dubbing is interrupted when the recording surface is changed from the surface A which is a first recording/reproducing surface and is usually called front surface over to the surface B which is a second recording/reproducing surface which is usually called back surface, i.e., the dubbing is interrupted in a section where a shut-off occurs.

Further, at the time when the first recording/reproducing surface of the cassette tape which is the second recording medium is to be changed over to the second recording/reproducing surface thereof, it can be contrived to resume the synchronous dubbing by making an access to the head of a tune on the side of the CD which is the first recording medium reproduced at the end of the first surface, introducing a pose after the access has been made, effecting the recording of the second recording medium and resetting the pose on the side of the CD which is the first recording medium after the recording/reproducing surface of the cassette tape which is the second recording medium is completely changed over to the second recording/reproducing surface thereof. In this case, however, the same tune is dubbed twice into the MD which is the third recording medium, one of these tunes being recorded in an incomplete form. Dubbing of the same tune two times results in a decrease in the recording time on the side of the MD.

SUMMARY OF THE INVENTION

It is therefore an object of the present invention to provide a recording/reproducing device for dubbing a program recorded in a first recording medium into a second recording medium having at least two recording regions and into a third recording medium in parallel, comprising:

reproduction means for reproducing a program from said first recording medium;

first recording means for recording the program reproduced by said reproduction means into said second recording medium;

second recording means for recording the program reproduced by said reproduction means into said third recording medium;

detector means for detecting the occurrence of change-over of the recording region into where the program is recorded on said second recording medium;

conveyer means for conveying said reproduction means to a head part of the program being reproduced from said first recording medium;

eraser means for erasing a predetermined program recorded in said third recording medium; and control means which, when said detector means has detected the occurrence of change-over of the recording region into where the program is recorded on said second recording medium, controls said second recording means to no longer record the program into said third recording medium, controls said conveyer means so as to convey said reproduction means to the head part of the program of said first recording medium that had been reproduced at the time when said detector means has detected the occurrence of change-over of the program recording region of said second recording medium, controls said reproduction means, said first recording means and said second recording means so as to execute the dubbing in synchronism after the change-over of the recording region of said second recording medium has been completed, subsequently and controls said eraser means to erase the program that has been recorded in said third recording medium just before the occurrence of change-over of the program recording region of the second recording medium.

The present invention further has an object of providing a recording/reproducing method of copying a program recorded in a first recording medium into a second recording medium having at least two recording regions and into a third recording medium in parallel, comprising:

a step of reproducing a program from said first recording medium, and recording the reproduced program into said second recording medium and into said third recording medium;

a step of detecting the occurrence of change-over of the recording region into where the program is recorded on said second recording medium;

a step of halting the recording of the program into said third recording medium when there is detected the occurrence of change-over of the recording region of said second recording medium into where the program is recorded, and reproducing the program of the first recording medium from the head part thereof that had been reproduced at the time when the occurrence of change-over of the recording region of the second recording medium was detected;

a step of controlling the reproduction of the program from the first recording medium, controlling the recording of the program into said second recording medium and the recording of said program into said third recording medium in synchronism after the completion of change-over of the recording region of said second recording medium into where the program is recorded; and a step of erasing the program recorded into said third recording medium just before the occurrence of change-over of the recording region of said second recording medium.

The invention further has an object of providing a recording/reproducing device for dubbing a program recorded in a first recording medium into a second recording medium having at least two recording regions and into a third recording medium in parallel, comprising:

reproduction means for reproducing a program from said first recording medium;

first recording means for recording the program reproduced by said reproduction means into said second recording medium;

second recording means for recording the program reproduced by said reproduction means into said third recording medium;

change-over detector means for detecting the occurrence of change-over of the recording region into where the program is recorded on said second recording medium;

sound detector means for detecting the presence of data of the program reproduced from said first recording medium;

conveyer means for conveying said reproduction means to a head part of the program being reproduced from said first recording medium;

eraser means for erasing a predetermined program recorded in said third recording medium; and control means which, when said change-over detector means has detected the occurrence of change-over of the recording region into where the program is recorded on said second recording medium and when said sound detector means has detected sound, controls said second recording means to no longer record the program into said third recording medium, controls said conveyer means so as to convey said reproduction means to the head part of the program of said first recording medium that had been reproduced at the time when said detector means has detected the occurrence of change-over of the program recording region of said second recording medium, controls said reproduction means, said first recording means and said second recording means so as to execute the dubbing in synchronism after the change-over of the recording region of said second recording medium has been completed, controls said eraser means to erase the program that has been recorded in said third recording medium just before the occurrence of change-over of the program recording region of the second recording medium, controls said second recording means to no longer record the program into said third recording medium when said change-over detector means has detected the occurrence of change-over of the program recording region of said second recording medium and when said sound detector means has detected no sound, and controls said reproduction means, said first recording means and said second recording means so as to continue the dubbing in synchronism after the completion of change-over of the recording region of said second recording medium.

BRIEF DESCRIPTION OF THE DRAWINGS

FIG. 3 is a diagram illustrating U-TOC sectors used in the present invention;

FIG. 4 is a diagram illustrating a form of linking the U-TOC sectors of an MD used in the present invention;

FIG. 6A is a diagram illustrating tracks recorded in a CD during the dubbing by using the recording/reproducing device of the present invention;

FIG. 6B is a diagram illustrating tracks recorded in an MD during the dubbing by using the recording/reproducing device of the present invention;

FIG. 6C is a diagram illustrating tracks recorded in a tape during the dubbing by using the recording/reproducing device of the present invention;

FIG. 7A is a diagram illustrating a state of recording, the tracks in the CD that serves as a source in the dubbing by using the recording/reproducing device of the present invention;

FIG. 7B is a diagram illustrating the reproduced results in the CD that serves as the source in the dubbing by using the recording/reproducing device of the present invention;

FIG. 7C is a diagram of tracks illustrating the results of dubbing into the MD by using the recording/reproducing device of the present invention;

FIG. 7D is a diagram of tracks illustrating the results of dubbing into the tape by using the recording/reproducing device of the present invention;

FIG. 8A is a diagram showing a reproduced state in the CD that serves as the source for illustrating addresses of the U-TOC in the MD used in the present invention;

FIG. 8B is a diagram showing the operation for recording the programs in the tape for illustrating the addresses of the U-TOC in the MD used in the present invention;

FIG. 8C is a diagram illustrating a state of recording the program in the MD for illustrating the addresses of the U-TOC in the MD used in the present invention;

FIG. 9 is a diagram (I) illustrating a state of writing the U-TOC in the MD used in the present invention;

FIG. 10 is a diagram (II) illustrating a state of writing the U-TOC in the MD used in the present invention;

FIG. 11 is a diagram (III) illustrating a state of writing the U-TOC in the MD used in the present invention;

FIG. 12 is a diagram (IV) illustrating a state of writing the U-TOC in the MD used in the present invention;

DESCRIPTION OF THE PREFERRED EMBODIMENTS

An embodiment of the invention will now be described with reference to FIG. 1 dealing with, as a recording/reproducing device, a CD/MD/tape composite device which is a dubbing device capable of recording a program such as audio data reproduced from a CD into a tape and an MD simultaneously by using a device for reproducing the CD which is a first recording medium and a recording/reproducing device for recording the data into, and reproducing the data from, the tape represented by the compact cassette tape, for example which is a second recording medium and for recording the data into, and reproducing the data from, the MD which is a third recording medium.

Figure 1:
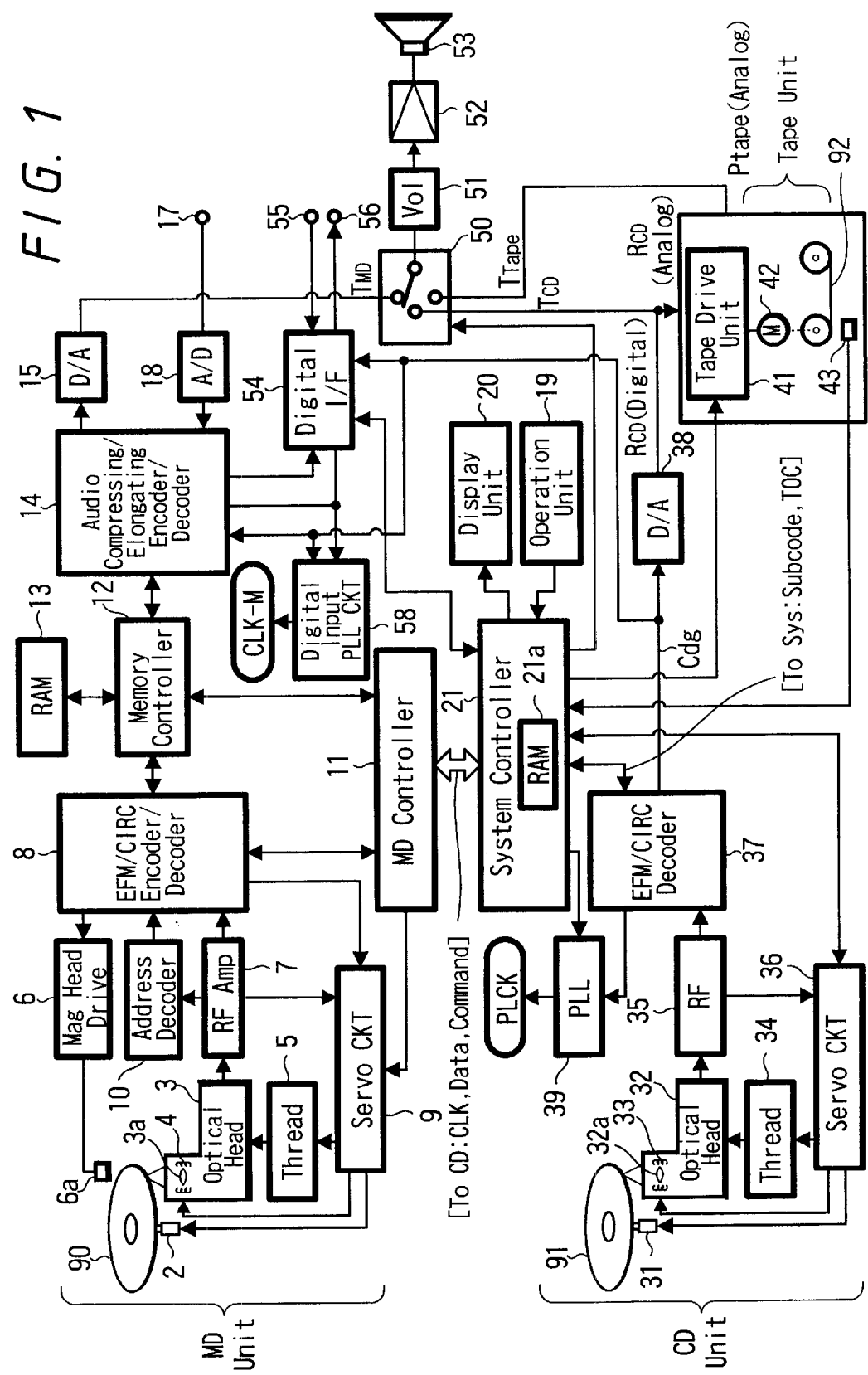
FIG. 1 is a block diagram of a recording/reproducing device according to an embodiment of the present invention.

In FIG. 1, a magnetic-optic disc MD 90 is loaded in an MD unit that effects the recording/reproducing operation for the MD. The MD 90 is a medium capable of recording audio data and the like data, and is rotated by a spindle motor 2 at the time of recording/reproduction.

An optical head 3 works as a recording/reproducing head by projecting a laser beam onto the magnetic-optic disc MD 90 at the time of recording/reproduction. That is, the optical head 3, at the time of recording, outputs a laser beam of a high level for heating the recording track up to the Curie temperature and outputs, at the time of reproduction, a laser beam of a relatively low level for detecting the data from the reflected light relying upon the magnetic Kerr effect.

For this purpose, the optical head 3 includes an optical system constituted by a laser diode, a polarized beam splitter and an objective, as well as a detector for detecting the reflected light. The objective 3*a* is held by a biaxial mechanism 4 so as to be displaced in the radial direction of the disc and in a direction to approach, and separate away from, the MD 90. The optical head 3 as a whole is allowed to move in the radial direction of the MD 90 by a thread mechanism 5. A magnetic head 6*a* is disposed at a position opposed to the optical head 3 with the MD 90 sandwiched therebetween. The magnetic head 6*a* works to apply a magnetic field modulated by the supplied data onto the MD 90. The magnetic head 6*a* moves together with the optical head 3 in the radial direction of the disc due to the thread mechanism 5.

The data detected from the MD 90 by the optical head 3 at the time of reproducing operation are fed to an RF amplifier 7. The RF amplifier 7 operates the data that are fed to pick up reproduced RF signals, a tracking error signal, a focus error signal and groove data. The groove data are the ones related to an absolute position recorded in the form a wobble (zig-zag shape) formed in the groove which is a recording track of the MD 90. The reproduced RF signals that are picked up are fed to an encoder/decoder unit 8. The tracking error signal and the focus error signal are fed to a servo circuit 9, and the groove data are fed to an address decoder 10 and are demodulated. Address data decoded from the groove data, address data recorded as data and decoded through the encoder/decoder unit 8, and subcode data, are fed to an MD controller 11 constituted by a microcomputer and are used for executing a variety of control operations. The MD controller 11 executes a variety of control operations in the MD unit.

In response to tracking error signals, a focus error signal, a track jump instruction from the MD controller 11, an access instruction and a revolving speed detection data from a spindle motor 2, the servo circuit 9 generates various servo drive signals, controls the biaxial mechanism 4 and the thread mechanism 5 to control the focusing and tracking and, further, controls the spindle motor 2 to run at a constant linear velocity (CLV).

The reproduced RF signals are subjected to the decoding such as EFM demodulation (eight-to-fourteen modulation) or CIRC (cross interleave Reedsolomon code), etc. through the encoder/decoder unit 8, and are once written into a buffer memory 13 through the memory controller 12. The data are read from the MD 90 by the optical head 3 and the reproduced data are transferred from the optical head 3 to the buffer memory 13 at 1.41 Mbits/sec and intermittently.

The data written in the buffer memory 13 are read out at such a timing that the reproduced data are transferred at 0.3 Mbits/sec and are fed to the encoder/decoder unit 14. Then, the reproduced signals are put to the decoding for the audio compression processing to obtain 16-bit quantized 44.1 kHz-sampled audio data. The data are then converted into analog signals through a D/A converter 15 and are fed to a terminal TMD of a change-over circuit 50. During the reproducing operation of the MD 90, the change-over circuit 50 is connected to the terminal TMD due to a system controller 21 that controls the operation of the whole device. Therefore, the reproduced audio signals output from the encoder/decoder unit 14 and converted into analog signals through the D/A converter 15, are fed to a sound volume-adjusting unit 51 and a power amplifier 52 through the change-over circuit 50, and are output from a speaker 53 as reproduced audio sound.

The data are written into, or read out from, the buffer memory 13 by specifying an address by controlling a writing pointer and a reading pointer by the memory controller 12. Here, since there is a difference in the bit rate between the writing and the reading as described above, the data are stored to some extent in the buffer memory 13 at all times. Thus, upon outputting the reproduced audio signals through the buffer memory 13, the output of the reproduced audio signals is not interrupted even when the tracking by the optical head is deviated due, for example, to disturbance. Reading of the data is resumed by making access to the correct tracking position while the data are still remaining in the buffer memory 13, and the operation is continued without affecting the reproduced output. Namely, this makes the device immune to vibration to a striking degree.

The recording/reproducing device is provided with a digital interface 54, and the reproduced data that are decoded through the encoder/decoder unit 14 at the time of reproduction are fed to the digital interface 54, too. The digital interface 54 encodes the reproduced data and the subcode data that are also picked up at the time of reproduction into a data stream of a predetermined digital interface format, and produces them as an optical digital signal through a digital output terminal 56. That is, the reproduced data are output in the form of digital data to external units.

In executing the recording operation for the MD 90, the recording signals such as analog audio signals fed to an analog input terminal 17 are converted into 16-bit quantized 44.1 kHz-sampled digital data through the A/D converter 18, and are fed to the encoder/decoder unit 14 to subject them to the audio compression encoding processing to compress the amount of data into about one-fifth. The data obtained through the digital interface 54 can also be recorded into the MD 90. That is, the signals of a digital interface format supplied to a digital input terminal 55 from an external unit are decoded through the digital interface 54 thereby to pick up audio data and subcodes. Here, the control data such as subcodes are fed to the system controller 21, the audio data (16-bit quantized 44.1 kHz-sampled digital data) which are the recording data are fed to the encoder/decoder unit 14 and are subjected to the audio compression encode processing to compress the amount of data into about one-fifth. Further, the audio data reproduced from a CD 91 in a CD unit that will be described later can be recorded into the MD 90 and into a cassette tape 92 simultaneously. This is the so-called dubbing. In this case, the CD reproduction data cdg which are the audio data reproduced from the CD91 and output from the EFM/CIRC decoder 37, and are the 16-bit quantized 44.1 kHz-sampled digital data are fed to the encoder/decoder unit 14, and are subjected to the audio compression encoding processing to compress the amount of data into about one-fifth. The data are further converted into CD reproduction analog signals through a D/A converter 38 and are fed to the cassette tape unit and the sound volume-adjusting unit 51.

Further, a digital input PLL circuit 58 inputs digital audio data input through the digital interface 54 or the CD reproduction data cdg output from the CD unit that will be described later, in order to form clocks CLK·M in synchronism with the synchronizing signals of synchronizing patterns inserted in the audio data that are input. The clocks CLK·M have a predetermined frequency obtained by multiplying, for example, fs=44.1 kHz as a base. The clocks CLK·M are converted into a required frequency by being divided or multiplied and are used for, at least, processing the signals in the encoder/decoder unit 14 at the time of recording the data that are input in the form of digital data into the MD unit and for transferring the input/output data.

The recording data compressed through the encoder/decoder unit 14 are once written into the buffer memory 13 by the memory controller 12, and are read out at predetermined timings and are sent to the encoder/decoder unit 8. After subjected to the encoding processing such as CIRC encoding or EFM modulation through the encoder/decoder unit 8, the recording data are fed to a magnetic head drive circuit 6.

The magnetic head drive circuit 6 feeds a magnetic head drive signal to the magnetic head 6a in response to the encoded recording data, i.e., causes the magnetic head 6a to apply a magnetic field of N or S to the MD 90. At this moment, the MD controller 11 feeds a control signal to the optical head 3 so as to produce a laser beam of a recording level.

In executing the recording/reproducing operation for the MD 90, it is necessary to read management data recorded in the MD 90, i.e., to read P-TOC (premastered table of contents) and U-TOC (user TOC). Based upon these management data, the MD controller 11 judges an address of an area to where the data be recorded on the MD 90 and an address of an area from where the data are to be reproduced. The management data are held in the buffer memory 13. Therefore, in the buffer memory 13 have been set a buffer area for the recording/reproduction data, and an area for holding the management data in a separated manner. At the time when the MD 90 is loaded, the MD controller 11 reads the management data by executing the reproduction operation for the innermost peripheral side of the disk storing the management data, and stores the data in the buffer memory 13, so that reference can hereinafter be made thereto at the time of executing the recording/reproducing operation for the MD 90.

The U-TOC is edited and rewritten depending upon the recording and erasure of the data. The MD controller 11 effects the editing processing for the U-TOC data stored in the buffer memory 13 for every recording/erasing operation, and rewrites the data even for the U-TOC area in the MD 90 at a predetermined timing depending upon the rewriting operation.

In the recording/reproducing device, further, a reproduction system has been constituted for the CD. The CD 91 which is an optical disk dedicated to the reproduction is loaded in the CD unit that executes the operation for reproducing the CD.

During the operation for reproducing the CD, the CD 91 is rotated by a spindle motor 31 at a constant linear velocity (CLV). The optical head 32 reads data recorded in the CD 91 in the form of pits, and sends the data to the RF amplifier 35. In the optical head 32, an objective 32a is held by a biaxial mechanism 33 so as to be displaced in the tracking direction and in the focusing direction. Further, the optical head 32 is allowed to move in the radial direction of the CD 91 due to the thread mechanism 34.

The RF amplifier 35 forms reproduced RF signals as well as a focus error signal and a tracking error signal. These error signals are fed to a servo circuit 36. The servo circuit 36 forms various drive signals such as a focus drive signal, a tracking drive signal, a thread drive signal and a spindle drive signal from the focus error signal and the tracking error signal, and controls the operations of the biaxial mechanism 33, thread mechanism 34 and spindle motor 31.

The reproduced RF signals are fed to the decoder 37 which converts the reproduced RF signals that are input into binary signals to obtain EFM signals . The EFM signals are subjected to the EFM demodulation and CIRC decoding in order to de code the data read from the CD 91 into 16-bit quantized 44.1 kHz-sampled digital audio data. The decoder 37 takes the constitution which enables to pick up control data such as TOC and subcodes. The TOC and subcodes are fed to the system controller 21 and are used for executing various control operations.

The EFM signals obtain ed by the binary processing through the decoder 37 are also fed to a PLL circuit 39. The PLL circuit 39 outputs clocks PLCK in synchronism with the channel bits of EFM signals that are input. The clocks PLCK have a frequency of 4.3218 MHz in a normal 1-multiplied speed. The clocks PLCK are utilized as the clocks of a signal processing circuit that succeeds the decoder 37.

The digital audio data output from the decoder 37 are converted into analog signals through the D/A converter 38 and are fed to a terminal TCD of a change-over circuit 50. During the operation for reproducing the CD, the system controller 21 causes the change-over circuit 50 to select the terminal TCD. Therefore, the audio signals reproduced from the CD 91 and are converted into analog signals through the D/A converter 38 are fed to a sound volume-adjusting unit 51 and to a power amplifier 52 through the change-over circuit 50, and are output from a speaker 53 as the reproduced audio sound.

In this embodiment, the data reproduced from the CD can be dubbed into the MD 90. In this case, however, the digital audio data output from the decoder 37 are directly fed to the encoding/decoding unit 14. Further, the digital audio data output from the decoder 37 are fed to the digital interface 54, too, enabling the data cdg reproduced from the CD of a digital format to be output to an external unit from a digital output terminal 56.

To reproduce the CD 91, the management data recorded in the CD 91 must be read out, i.e., TOC must be read out. The system controller 21 judges the number of tracks and the addresses of tracks recorded in the CD 91 relying upon the management data, and controls the reproducing operation. When the CD 91 is loaded, therefore, the system controller 21 executes the operation for reproducing the innermost peripheral side of the disk on where TOC is recorded to read the data, and stores the data in a RAM 21a in the system controller 21, so that a reference can be made hereinafter thereto at the time of executing the operation for reproducing the CD 91.

The system controller 21 is a microcomputer for controlling the whole device, and gives various instructions to the MD controller 11 to have the MD controller 11 control the operation of the MD unit. During the recording/reproduction of the MD 90, the system controller 21 receives management data such as subcodes and the like from the MD controller 11. Further, the system controller 11 directly controls the operation of the CD unit. The RAM 21a in the system controller 21 is the memory for temporarily holding various data needed by the system controller 21 to execute a required processing.

In this embodiment, the system controller 21 outputs clocks CLK obtained on the side of the CD unit, various data DATA and commands COMMANDs for giving various instructions to the MD controller 11 depending upon the reproducing operation in the CD unit. The clocks CLK obtained on the side of the CD unit are those clocks having a predetermined frequency obtained based, for example, upon PLCK. The data DATA includes TOC obtained at the time of reproducing the CD, subcodes and the like data.

The recording/reproducing device further includes a tape unit for recording the signals reproduced in the CD unit into an analog-type cassette tape recorder or into a reel-to-reel tape recorder simultaneously with recording into the MD 90.

Figure 2:
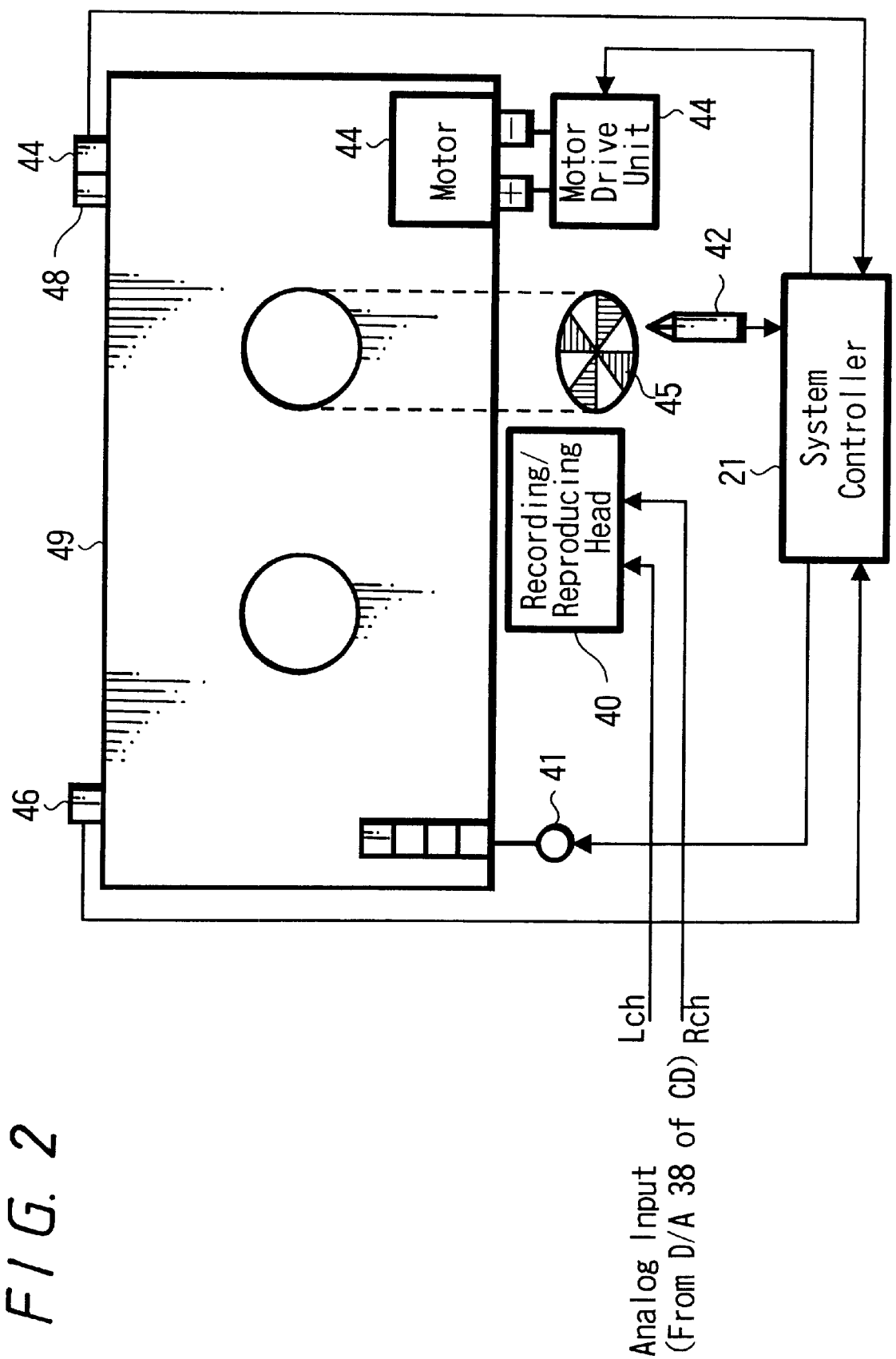
FIG. 2 is a diagram illustrating how to detect the reversal of the tape in the tape unit of the present invention.

The tape unit has a recording/reproducing head 40. As shown in FIG. 2, right and left analog audio signals from the D/A converter 38 in the CD unit are fed to the recording head in the recording/reproducing head 40 so as to be dubbed into the tape 92 simultaneously with the MD 90. The analog audio signals PTAPE reproduced by the reproducing head in the recording/reproducing head 40 are fed to a terminal TTAPE of the change-over circuit 50 and are fed to the audio adjusting unit 51 and to the power amplifier 52, and are output as sound from the speaker 53.

The system controller 21 drives a tape drive unit 41 in the tape unit to control the forward rotation and the reverse rotation of the tape 92. To change the mode such as reproduction, recording, FF (fast forward) and REW (rewind), a plunger shown in FIG. 2 is pulled for a predetermined period of time so that the system controller 21 changes the cams and gears. A disk 45 on which a radial pattern is printed is pivot on a hub shaft for winding the tape 92, the disk 45 rotating in synchronism with the tape 92, and the rotation is detected by a photo detector 42 disposed opposing the disk 45 to detect the number of revolutions of the tape 92. When the tape does not rotate for a predetermined period of time, the system controller 21 works to shut the tape 92 off or to reversely rotate the tape 92.

There are further provided a switch 48 for detecting the presence of the tape 92, and detector switches 46, 47 for detecting the surface A and the surface B of the cassette tape. The surfaces A and B are detected by the system controller 21.

When the recording into the surface A has been finished, the pawl has been folded to prevent undesired erasure of the surface B, and the MD 90 and the tape 92 are being dubbed simultaneously, the dubbing into the tape 92 from the CD 91 is interrupted by the switches 46 and 47 that detect the surfaces A and B, and the signals reproduced from the CD are dubbed into the MD 90 only.

This control system is only an example. Instead, there may be provided a CD controller or a tape control for executing the control operation on the CD side or on the tape side. Further, the system controller 21 and the MD controller 11 may be constituted as a unitary structure.

The operation unit 19 includes a record key, a reproduction key, a stop key, an AMS key, a search key, a dubbing key (enabling either a steady-speed dubbing or a high-speed dubbing to be set) so as to be manipulated by a user, so that the reproducing/recording operations can be carried out for the MD 90, CD 91 and tape 92. It is further allowable to input a character sequence for recording incidental data such as a track name into the MD 90, to determine the registration and to carry out the operation in the registration mode. The operation data from the operation unit 19 are fed to the system controller 21 which executes required operations for the parts based upon the operation data and the operation program. Though not diagramed, the operation unit 19 may further include a remote operation function by, for example, an infrared-ray remote commander.

The display unit 20 makes required displays at the time of reproducing or recording the MD 90, CD 91 and tape 92. There are displayed time data such as total play time, elapse of reproducing or recording time, as well as various displays such as track number, state of operation and mode of operation being controlled by the system controller 11.

In the thus constituted recording/reproducing device of the embodiment, it is allowed to simultaneously carry out the MD reproducing operation, MD recording operation, CD reproducing operation, tape reproducing operation, tape recording operation, dubbing operation from CD into MD, dubbing operation from CD into tape, and dubbing operation from CD into MD and CD.

In this embodiment, in particular, the dubbing operation from CD into MD or tape can be a normal 1-multiplied dubbing operation or can be a high-speed dubbing operation which is faster by a predetermined number of times or is faster by N times in a manner as described below.

In the high-speed dubbing of from the CD 91 into the MD 90, for example, the spindle motor 31 is driven by setting a CLV speed which is N times faster than the normal 1-multiplied speed. In this state, the data are reproduced from the CD 91. In the PLL circuit 39, for example, N×4.3218=8.6436 MHz (a clock frequency N times larger than that of the normal speed) is set as a target value for locking to an N=2-multipled speed. The target value for the PLL circuit 39 is changed over being controlled by the system controller 21. In a state where the PLL circuit 39 is locked, therefore, the CD 91 stably rotates at an N-multiplied CLV, and the decoder 37 and the D/A converter 38 normally execute the signal processing at an N-multiplied speed. Upon effecting the processing at the N-multiplied speed, the CD reproduction data cdg having a sampling frequency of 88.2 kHz (=44.1×2) and a quantized bit number of 16 are transferred to the encoder/decoder unit 14 on the MD unit side at a transfer rate multiplied by N relative to the normal 1-multiplied speed.

The CD reproduction data cdg are further fed to the digital input PLL circuit 58 at the N-multiplied transfer rate. In the digital input PLL circuit 58, the target value is so set as will be locked at a channel clock frequency N times as large as the normal speed. The target value is changed by, for example, being controlled by the MD controller 11 depending upon a command from the system controller 21. In a state where the digital input PLL circuit 58 is locked, therefore, a frequency N times as large as that of normal speed is obtained as clocks CLK·M. At the timings of the clocks CLK·M, the encoder/decoder unit 14 effects the signal compression processing and transfers the data to the memory controller 12 or, in other words, writes data into the buffer memory 13, in order to execute the record signal processing in synchronism with the CD reproduction data cdg fed from the CD unit at the N-multiplied transfer rate.

Further, reading of the data stored in the buffer memory 13 by the encoder/decoder unit 8, and the operation timing for recording data into the MD 90 through the signal processing in the encoder/decoder unit 8, are suitably executed by utilizing master clocks fed from the side of the MD controller 11 or by utilizing clocks obtained at the time of controlling the revolution by using a wobble period formed in the MD.

In the MD unit as will be understood from the foregoing description, the reading speed at the time of recording is set to be high compared to the speed of writing data into the buffer memory 13 and, hence, the recording is effected intermittently into the MD 90. That is, when the data are stored by more than a predetermined amount in the buffer memory 13, the data are written into the MD 90. When the amount of data in the buffer memory 13 becomes smaller than a predetermined amount or becomes zero due to the operation for writing the data, the writing operation waits for until the data are stored in the predetermined amount enough for effecting the writing. The above operation is repetitively executed.

Therefore, the rotational speed of the MD 91 at the time of dubbing at the N-multiplied speed, the transfer rate of input/output data for the encoder/decoder unit 8 and the signal processing speed, need not necessarily be set to a multiplied speed to meet the reproduction at the N-multiplied speed on the CD unit side. That is, even when the data input/output rate for the encoder/decoder unit 8 and the signal processing speed are set be the 1-multiplied speed by rotating the MD 90 at the 1-multiplied speed, the period for halting the writing into the MD 90 becomes shorter than that of during the normal 1-multiplied speed or the recording is effected continuously instead of being intermittently effected, and the data are properly recorded into the MD 90. Depending upon the conditions such as capacity, etc. of the buffer memory 13, however, the rotational speed of the MD 91, transfer rate of input/output data for the encoder/decoder unit 8, and the signal processing speed can be set to a predetermined multiplied speed.

The data can be dubbed at a high speed into the tape 92 in the tape unit by driving the motor in the tape drive unit at an N-multiplied speed in synchronism with the CD 91.

Next, described below is the TOC used for the MD 90. A cluster format is formed on the whole region of the magnetic-optic disc MD 90. Here, however, the innermost peripheral side which is an area divided in the radial direction is used as the management region, and a program region is formed following the management region. On the innermost peripheral side of the disc is provided a reproduction-only region where the reproduction-only data are recorded by phase pits, followed by the formation of a magnetic-optic region that permits the magnetic-optic recording and reproduction. The management region shares the reproduction-only region and the innermost peripheral portion of the magnetic-optic region.

A program region is formed following the management region of the magnetic-optic region. In the program region, audio data are recorded in the sectors that constitute a main data region which is also called recordable user area. Further, a P-TOC (premastered TOC) that manages the whole areas of the disc is provided in the reproduction-only region as a management region, and in a subsequent management region in the magnetic-optic region are recorded content data (U-TOC: user table of contents) for managing the programs of tunes recorded in the program region.

Described below is a U-TOC sector as management data for managing the recording/reproducing operation of the track in the MD 90. FIG. 3 illustrates a format of a U-TOC sector 0. The U-TOC sectors can be provided from a sector 0 to a sector 31. That is, there can be used the sectors (S00 to S1F.) of a cluster in the management region. The sectors 1 and 4 are the areas for recording character data, and the sector 2 is the area for recording the date of recording. The U-TOC sector 0 is a data region storing chiefly the tunes recorded by the user and the management data related to free areas where the tunes can be newly recorded. That is, the sector 0 manages start addresses which are the start points of the programs, end addresses which are the end points, copy protect data forming track modes representing the attributes of the programs and emphasis data, that are recorded in the program region.

To record a tune in a disc 1, for example, the system controller 11 searches a free area on the disc starting from the U-TOC sector 0, and records the audio data in this area. At the time of reproduction, further, the area where there is recorded the tune to be reproduced is discriminated from the U-TOC sector 0, and access is made to the area to execute the reproducing operation.

Referring to FIG. 3, in the U-TOC 0 are recorded three-byte data "Cluster H", "Cluster L", "Selector" which are the addresses of the sector, a maker code "maker code" indicating the manufacturer of the disc, a model code "model code", a first program number "First TNO", a last program number "Last TNO", state of using the sectors "used sectors" disc serial number "disc serial No" and disc ID following the header portion in which a think pattern is formed by 12 bytes.

There is further recorded a correspondence table-designating data unit constituted by a pointer P-DFA (pointer for defective area) representing the head position of a slot where there will be stored defect position data formed on the disc, a pointer P-EMPTY (pointer for empty slot) representing the state of using slots, a pointer P-FRA (pointer for free area) representing the head position of the slot that manages the region where the data can be recorded, and pointers P-TNO1, P-TNO2, - - - , P-TNO255 representing the head positions of the slots corresponding to the program numbers.

There is further provided a management table unit including 255 8-byte slots. Each slot manages start address, end address, track mode and link data. In the magnetic-optic disc 90 of this embodiment, the data need not necessarily be recorded in a continuous form on the recording medium. Instead, data sequences may be discretely recorded as plural parts on the recording medium. The parts stand for the ones in which the data that are continuing in time are recorded in the cluster that is physically continuing.

As the recording/reproducing device that can be applied to the disc 90, the MD unit in FIG. 1 once stores the data in the buffer memory 13 as described above, and changes the writing rate and the reading rate for the buffer memory 13. Upon having the optical head 3 making access successively to the data discretely recorded on the disc 90 and having the buffer memory 13 store the data, therefore, the data can be reproduced in the form of data sequences on the buffer memory 13. Even with this constitution, the writing rate into the buffer memory 13 is faster than the reading rate at the time of reproduction, and the continuous audio reproduction is not interrupted.

Further, even when a program shorter than the program that has been recorded is overwritten on the program that has been recorded, the recorded content can be efficiently used by specifying it as a region where data can be recorded that is managed by the pointer P-FRA without erasing excess of portions.

Described below with reference to FIG. 4 is how to link the areas that exist discretely by using the example of the pointer P-FRA that manages the region where the data can be recorded. If it is now presumed that a value 03h is recorded in the pointer P-FRA that represents the head position of the slot managing the region where the data can be recorded, then, access is made to a slot corresponding to 03h. Here, "h" represents hexadecimal. That is, the data of the slot 03h in the management table unit are read out. The start address data and the end address data recorded in the slot 03h represent a start point and an end point of a part recorded on the disc. The link data recorded in the slot 03h represents an address of a slot that follows, and 18h is recorded in this case. The link data recorded in the slot 18h is then traced to make an access to a slot 2Bh to grasp a start point and an end point of a part of the disk as a start address and an end address recorded in the slot 2Bh. Similarly, further, the link data is traced until there appears a data 00h as the link data in order to grasp the addresses of all parts managed by the pointer P-FRA.

As described above, the slot is traced until the link data becomes null represented by 00h starting from the slot instructed by the pointer P-FRA, and the parts discretely recorded on the disc are linked on the memory. In this case, the whole parts on the disc 90 can be grasped as the region where the data can be recorded. Though the pointer P-FRA was described above, the pointers P-DFA, P-EMPTY, P-TN01, P-TN02, - - - , P-TN0255, too, work to link and manage the parts that are present in a discrete manner.

Figure 5:
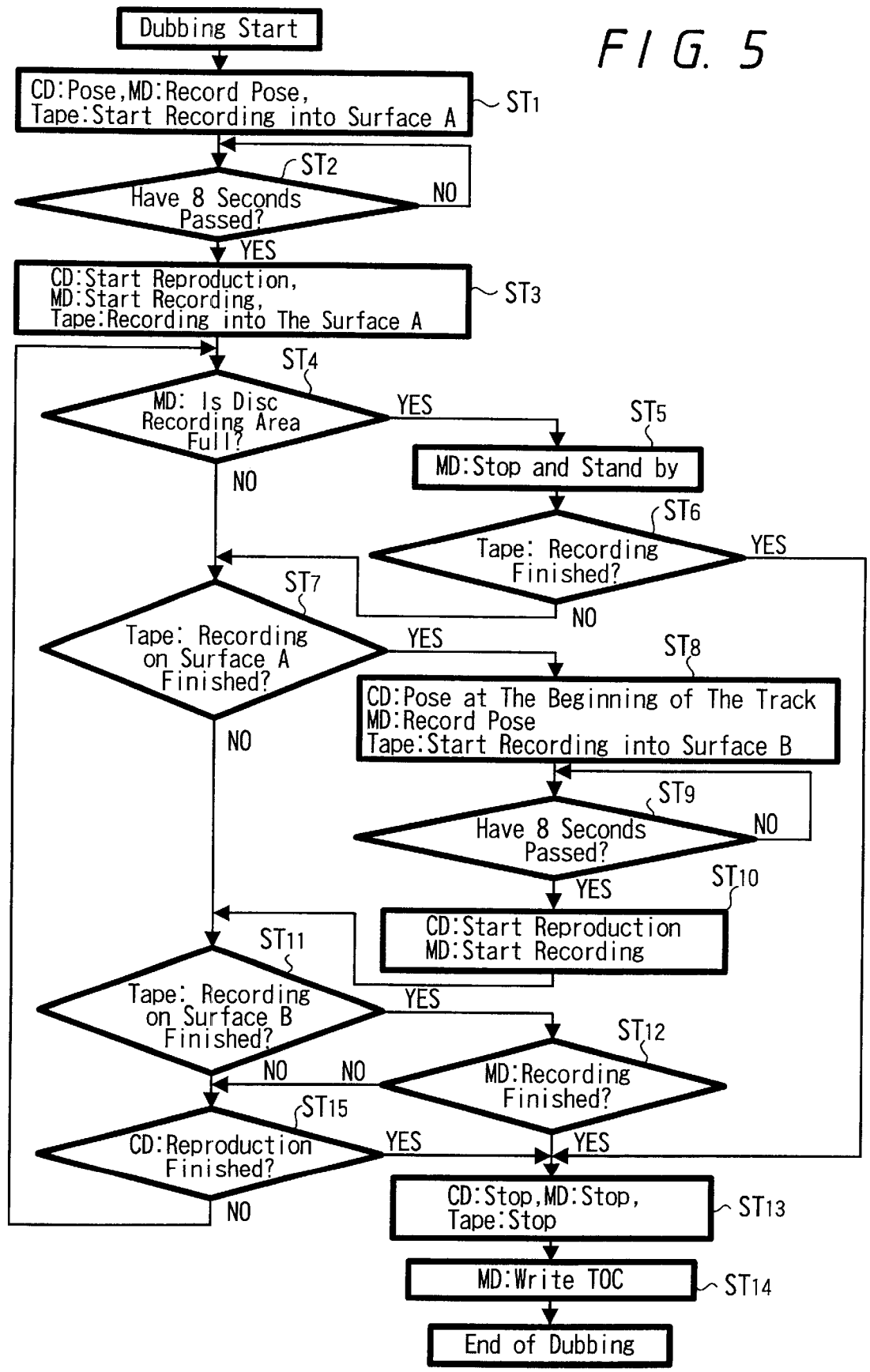
FIG. 5 is a flowchart during the dubbing using the recording/reproducing device of the present invention.

Described below with reference to a flowchart of FIG. 5 and a time chart of FIG. 6A and FIG. 6C is the operation of the recording/reproducing device of the present invention having the above-mentioned circuit constitution and of the recording/reproducing method of the invention in the case when a program such as audio data reproduced from the CD 91 which is a first recording medium is to be dubbed into the tape 92 which is a second recording medium and into the MD 90 which is a third recording medium simultaneously at a low speed or at a high speed.

First, the dubbing key in the operation unit 19 of FIG. 1 is operated to start the dubbing. At first step ST1, the CD91 is placed in a state of reproduction pose and the MD 90 is placed in a state of recording pose. The tape 92 of the cassette 49 shown in FIG. 2 is controlled by the system controller 21 and by the MD controller 11 so as to start the recording into the surface A.

In order that no program is recorded from the CD 91 into the record-forbidding portions of the leader tape and the end tape of the tape unit wound on the take-up hub and the feeding hub of a cassette 49, the CPU 21 constituting the system controller holds the CD 91 and the MD 90 in the state of pose for a period of time corresponding to the length of the leader tape, e.g., for 8 seconds.

At second step ST2, the CPU 21 judges whether 8 seconds have passed, and proceeds the routine to third step ST3 after 8 seconds have passed.

At third step ST3, the CD 91 is reset from the reproduction pose and starts the reproduction, and the MD 90, too, is reset from the recording pose and starts the recording.

At fourth step ST4, it is judged whether the recording areas of the MD 90 have all been spent out. When the recording region of the MD 90 is full, the routine proceeds to fifth step ST5 where the recording operation is discontinued to assume a standby state.

At sixth step ST6, whether the recording of the tape 92 has been finished is determined relying upon the rotation of the hub, which is an output of the photo detector 42 of FIG. 2. When the result is no, the routine proceeds to seventh step ST7 and when the result is yes, the routine proceeds to thirteenth step ST13 to stop the tape unit.

At seventh step ST7, the CPU 21 monitors the output of the surface A pawl detector switch 46 and the output of the photo detector 42 to determine whether the recording is finished on the surface A of the tape 92 of the cassette 49. When the recording on the surface A has been finished, the routine proceeds to eighth step ST8.

Here, if it is presumed that the recording portion of the surface A of the cassette 49 has run out at the middle of the third tune after the first and second tunes have been recorded in the surface A as shown in FIG. 6C, then, the end tape which is a transparent record-forbidding portion runs. It is therefore allowed to detect the presence of audio data, output of the photo detector 42, a change in the tension of the tape 92, or a difference in the light transmission factor between the tape leader portion and the recording region, and the shut-off state of the surface A can be easily detected.

At eighth step ST8, the CD91 is at the middle part of the third tune and, hence, returns to the beginning S3 of the track of the third tune to assume the state of reproduction pose as shown in FIG. 6A. The MD 90 discontinues the recording and stands by in a state of recording pose. In this case, the program recorded up to the middle part of the track of the third tune is erased in an extra time, i.e., erased during the writing of TOC, etc. The surface B of the tape 92 starts the recording.

At ninth step ST9, it is judged whether 8 seconds have passed in order to see if the record-forbidding portion such as the leader tape has been taken up.

After 8 seconds have passed at ninth step ST9, the CD 91 at step ST10 starts the reproduction and the MD 90 starts the recording again. In this case, the program of the third tune has been dubbed into the surface B of the tape 92 starting from the beginning of the third tune, as a matter of course.

At eleventh step ST11, it is checked whether the surface B of the tape 92 has ended. When the result is yes, the routine proceeds to twelfth step ST12. When the result is no, the routine proceeds to fifteenth step ST15.

At twelfth step ST12, it is checked whether the recording of the MD 90 is finished. When the surface B of the tape 92 has run out during the recording of the MD 90 and, besides, when the recording of the MD 90 has been halted, then, the CD 91, MD 90 and tape 92 are halted at thirteenth step ST13 to end the dubbing. when the MD 90 is in the recording step at twelfth step ST12, the recording is continued from the CD 91 into the MD 90. At fifteenth step ST15, it is check ed whether the reproduction of the CD 91 is finished. When it has been finished, the routine proceeds to thirteenth step ST13 to end the dubbing. When the reproduction of the CD91 has not been finished, the routine is returned to the head of fourth step ST4.

At fourteenth step ST14, the data are written into the U-TOC of the MD 90 at a moment when the reproduction of the CD 91 has finished, and the routine ends.

FIGS. 7A, 7B, 7C and 7D illustrate the results of when the program reproduced from the CD 91 is dubbed into the MD 90 and into the tape 92 according to the above-mentioned flowchart.

Described below with reference to FIG. 7A is a case where the play times of the tunes of from the first track to the fifth track are 5 minutes, each, and the CD 91 is to be recorded for a total time of 25 minutes. Dubbing is now carried out simultaneously for the MD 90 in which nothing has been recorded and for the tape 92 having the surface A of 23 minutes and the surface B of 23 minutes and both surfaces of 46 minutes. Here, as shown in FIG. 7D, the surface A of the tape 92 runs out during the reproduction of the fifth track of the CD 91 leaving about two minutes of the tune.

According to the present invention, therefore, the CD 91 is once placed in the state of reproduction pose, and the reproduction of the fifth track is started again from the beginning. Then, the play time of the CD is lengthened by three minutes as shown in FIG. 7B into 28 minutes, and the fifth track of the CD requires a play time of 8 minutes.

In this case, the MD 90 erases or overwrites the fifth track that is recorded up to its middle portion. After dubbed, therefore, the state of the tracks becomes as shown in FIG. 7C which becomes the same as the recording times of the CD 91 shown in FIG. 7A.

The tape 92 is reversed, i.e., changed from the surface A over to the surface B while the fifth track is being recorded. The fifth track is recorded again into the surface B. Therefore, there are employed a recording/reproducing device and a recording/reproducing method capable of dubbing the program reproduced from the CD 91 simultaneously into the MD 90 and the tape 92 as shown in FIG. 7D.

Described below with reference to FIGS. 8A, 8B, 8C, 9, 10, 11 and 12 is a processing for the record-possible region of the MD 90 which is the third recording medium after the dubbing illustrated in FIG. 4. When one recording surface of the cassette tape 92 which is the second recording medium is reversed to the other recording surface as described above, the program that had been recorded in the MD 90 at the time when the cassette tape 92 was reversed is dubbed in synchronism again after the cassette tape 92 is reversed and after it is made ready to effect the reproduction, from the head of the program that had been reproduced from the CD 91 which is the first recording medium when the cassette tape 92 was reversed.

It will therefore be understood that the same program is recorded twice in a portion of the MD, but the program recorded when the cassette tape 92 is reversed is not completely recorded.

FIGS. 8A, 8B and 8C illustrate a state where the synchronous dubbing is effected, FIG. 8A illustrating a state where the reversal has took place at a position marked with ▼ in recording the cassette tape 92. In recording the MD 90, addresses are attached onto the medium as shown in FIG. 8C.

In FIG. 8A, a program #1 is reproduced from the CD 91 and is dubbed into the cassette tape 92 and the MD 90 in synchronism. Here, addresses 000 to 090 are recorded as recording positions into the medium MD 90. while a program #2 reproduced from the CD 91 is being dubbed into the cassette tape 92 and the MD 90 in synchronism, the recording surface of the cassette tape 92 is reversed and #2-A is recorded as part of the program #2 in the MD 90. The part #2-A is recorded in the recording medium MD 90 from an address 091 through up to an address 098.

Upon receipt of the reversal of the recording surface of the cassette tape 92 while the program #2 is being dubbed in synchronism, the CD 91 reproduces the program #2 again so as to effect the dubbing in synchronism from the head of the program #2. That is, as shown in FIG. 8A, the part #2-A that had been reproduced just before the reversal of the cassette tape 92 during the recording and the remaining part #2-B of the program #2 are continuously reproduced and are recorded as the program #2 into the cassette tape 92 and into the MD 90. Accordingly, the program #2 is recorded into the recording medium MD 90 from an address 099 up to an address 136.

Due to the reversal of the cassette tape 92 during the recording, therefore, the part #2-A is recorded twice as part of the program #2 in the MD 90 which is the recording medium 3. The part #2-A recorded from the address 091 to the address 098 is the unnecessary part, and the presence of this part shortens the record-possible time of the MD 90 correspondingly.

It therefore becomes necessary to erase the part #2-A recorded from the address 091 to 098 that is not complete as the program #2 and to return the record-possible region, i.e., to return the record-possible time into a state where #2-A had not existed.

FIGS. 9, 10 and 11 illustrate changes in the management data in the U-TOC until the unnecessary part #2-A is generated by the synchronous dubbing in FIGS. 8A, 8B and 8C. The U-TOC shown in FIGS. 9 to 11 is the excerpts of the portions related to the description of the U-TOC shown in FIG. 3.

FIG. 9 illustrates a state of the U-TOC of prior to starting the synchronous dubbing, i.e., illustrates the state where no program has been recorded in the MD 90 which is the third recording medium.

In a correspondence table-designating data portion, P-EMPTY designates by a number 02h of the head of an unused management table among the management tables that manage the unrecorded regions. Further, P-FRA designates a number 01h of a management table portion that manages the start address and the end address of a first part in the unrecorded region called free address.

Further, table corresponding to the address 01h of the management table portion shows a range of from a start address 000 to an end address 399 as the unrecorded region. It will be understood that the unused region has no unused region that is to be linked since there is recorded no link data.

FIG. 10 illustrates a state of the U-TOC after the program #1 being dubbed is completely recorded.

In this state, P-EMPTY is recorded as 03h representing the number of the unused management table. In the management table number 02h, the addresses recording the program #1 are expressed as a start address 000 and an end address 090. The number 02h of the management table portion is recorded in P-TNO1 in the correspondence table-designating data portion with the program #1 as the track number 1. Further, the free area which is the unrecorded region is reduced by the recording of the program #1, and the start address is rewritten as 09 at the back of the end address of the program #1 as recorded in the management table portion No. 01h.

FIG. 11 illustrates the U-TOC in a state where the data have been recorded in the MD 90 inclusive of the unnecessary part #2-A described with reference to FIG. 8C due to the reversal of the recording surface of the cassette tape 92 after the synchronous dubbing shown in FIGS. 8A, 8B and 8C has finished.

A start address 000 and an end address 090 of the program #1 are recorded in a management table portion No. 02h, a start address 091 and an end address 098 of the part #2-A are recorded in a management table portion No. 03h, a start address 099 and an end address 136 of the program #2 are recorded in a management table No. 04h, and a start address 137 and an end address 399 of a free area are recorded in a management table portion No. 01h.

In the correspondence table-designating data portion are recorded the numbers of the management table portions corresponding to the parts. That is, in the P-TNO is recorded a number 02h in the management table portion managing the address of the program #1, in the P-TN02 is recorded 03h, in the P-TN03 is recorded 04h, and in the P-EMPTY is recorded 05h indicating that the management table can be used from the No. 05h. FIG. 12 illustrates the results of when the unnecessary part #2-A is erased and the record-possible time is restored.

The above processing is realized by registering, as a free area, the number 03h of the management table portion managing the region where the unnecessary part #2-A is recorded.

In FIG. 12, the number is recorded to represent the number 04h of the management table portion managing the start address and the end address of the program #2 that is completely recorded as P-TNO2 in the correspondence table-designating data portion. This makes it a state where there is not exist the management table portion to indicate in the P-TNO3.

Further, 03h is recorded in the link data of the management table portion No. 01h so that the part #2-A is managed as a record-possible region. This makes it possible to manage the start address 091 up to the end address 098 recorded in the management table portion No. 03h as a free area after the address 399.

In erasing the unnecessary data as described above, the data themselves are not erased but part of the data in the U-TOC which are the management data are rewritten and are managed as being erased.

For easy explanation, in the foregoing was so described as to rewrite the U-TOC at the time when the recording of each program has ended. This, however, can also be realized by, for example, writing the U-TOC in the memory in the device prior to starting the recording, editing a copy of U-TOC in the memory after the program has been completely recorded, and writing the copy back into the U-TOC of MD 90.

It is further possible to overwrite the data into the -recording region where the program is incompletely recorded by rewriting the U-TOC while the tape is being reversed. Then, the record-possible time of the MD 90 is not incompletely recorded, and the display unit 20 does not produce a display that is temporarily decreased depending upon the program.

The above embodiment has dealt with the case when the tape is reversed while a predetermined track is being reproduced. However, when the tape is reversed between the tunes, i.e., at a dumb position between the predetermined track and the next track, detector means detects audio signals reproduced from the CD 91. When no acoustic signal is detected, the CD 91 is prevented from returning to the beginning of the track that is being reproduced despite the change-over from the recording region of the tape 92 is detected.

This constitution eliminates such an inconvenience that the CD is returned back to the head of the track that is being reproduced at the dumb position between the tracks.

The above embodiments have dealt with the cases where the data are dubbed into the MD and the tape simultaneously from the CD. The invention, however, can also be applied to the cases of dubbing data into plural recording media simultaneously involving the use of the tape, such as reproducing the MD and dubbing the data into the MD and into the tape, or reproducing the CD and dubbing the data into the semiconductor memory and the tape, by reproducing the semiconductor memory and dubbing the data into the MD and the tape.

The invention can be further utilized to simultaneously dubbing the data at a high speed or at a low speed by using a double-side-stuck disc for recording and reproducing data to and from both the front and the back surfaces like DVD-RAM or DVD-R/W that involves the reversal in picking up the signals like the tape, and to various recording media such as CD, MD, semiconductor memory and tape.

Figure 13:
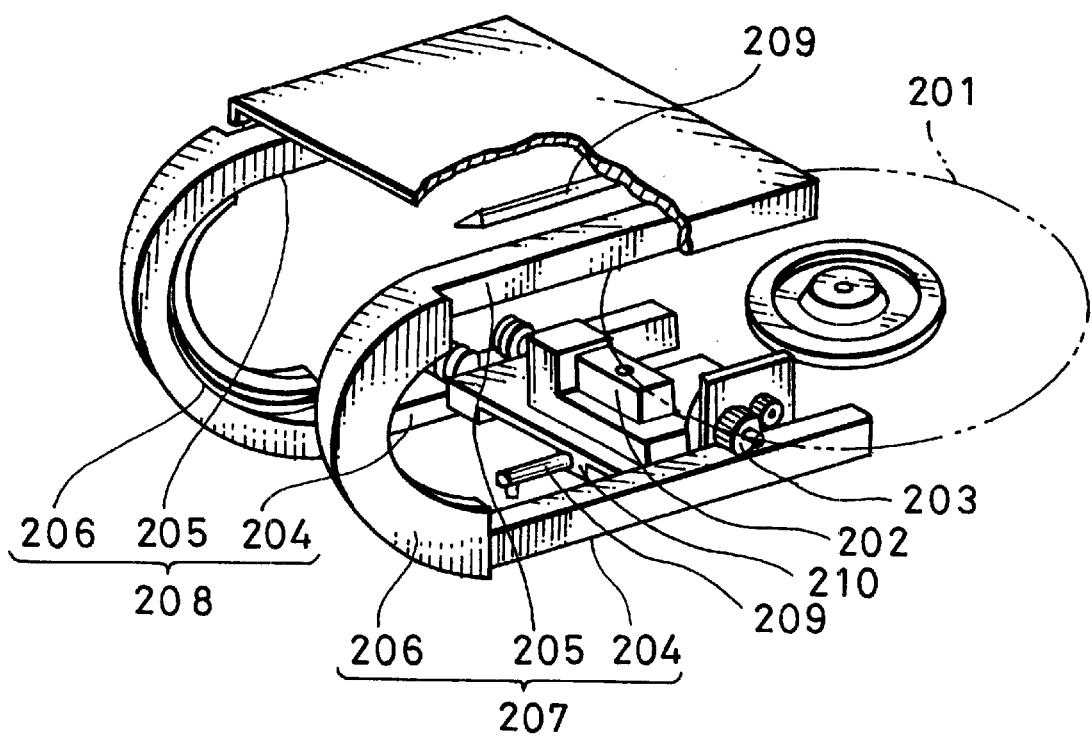
FIG. 13 is a diagram illustrating a mechanism for reversing a double-side-stuck disc used in the present invention.

Described below with reference to FIG. 13 is a constitution for reversing the disc 201 having a program recorded in both the front surface and the back surface like the double-side-stuck DVD-RAM that involves the reversal.

In FIG. 13, reference numeral 202 is a pickup for reading the program from a disc 201. A pickup-moving member 203 for moving the pickup 202 is constituted by a pinion and the like, and is in mesh with a first guide member 204 constituted by a rack and the like that guide the motion in the radial direction under the lower surface of the disk 201.

A second guide member 205 that guides the motion in the radial direction on the upper surface of the disk 201, is arranged in parallel with the first guide member 204, and these two guide members 204 and 205 are coupled together by a U-shaped coupling member 206 to constitute a pair of right and left pickup guide members 207 and 208.

Reference numeral 209 denotes a feed shaft provided on the side of the chassis, and 210 denotes a metal bearing provided on the side of the pickup 202. The feed shaft 209 is inserted in the metal bearing 210 to let the pickup 202 proceed straight.

To reproduce or record the back surface A which is the first surface in the above-mentioned constitution, the pickup 202 is on the side of the first guide member 204. To reproduce or record the front surface B which is the second surface, the pickup 202 passes over the U-shaped coupling member 206 and moves toward the side of the second guide member 205, and the optical system of the pickup 202 is faced downward to effect the reproduction or recording.

Figure 14:
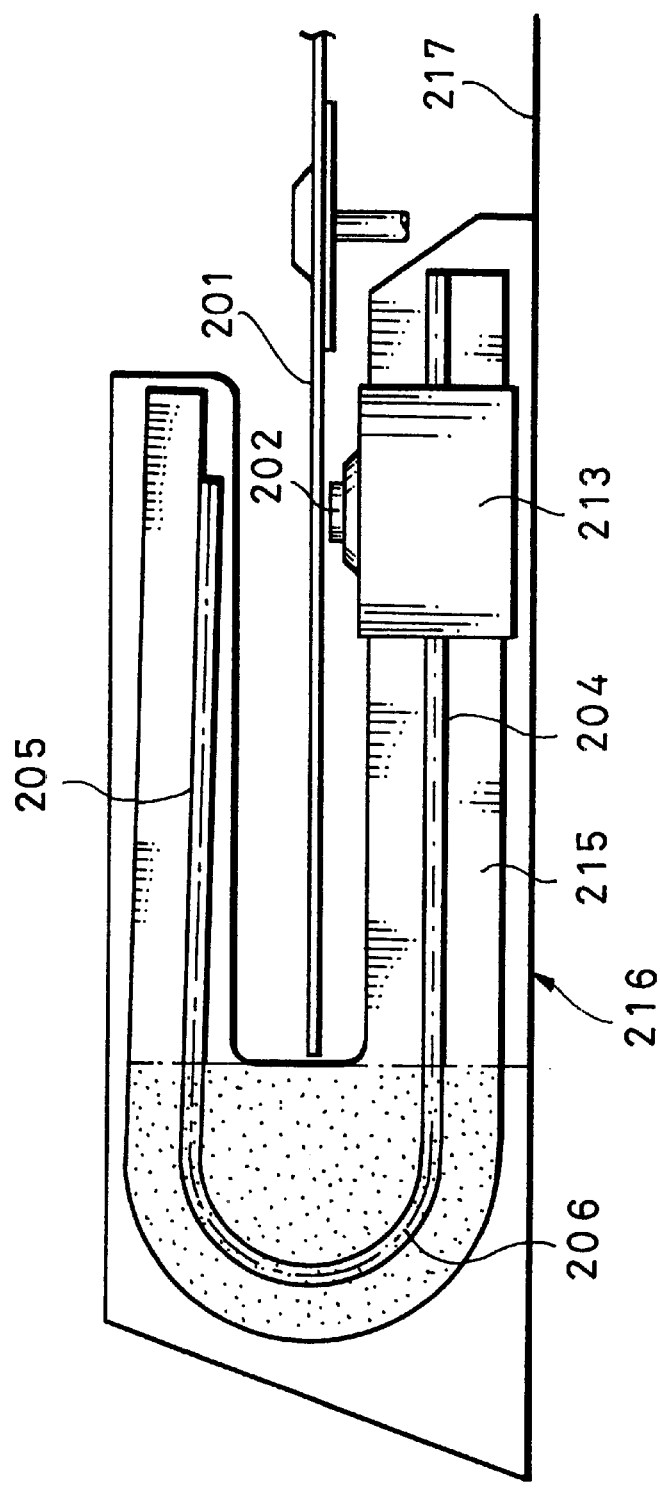
FIG. 14 is a diagram illustrating another mechanism for reversing the double-side-stuck disc used in the present invention.

Referring to FIG. 14, further, a cantilevered disc player includes an optical block 213 having a pickup 202 for reading the data recorded in the disc 201, a first guide member 204 for moving the optical block 213 along the disk 201 on the turntable, an optical block support member 216 having the first guide member 204 on the reference surface 215 for mounting the optical block, and a base plate 217 supporting the optical block support member 216.

The optical block 213 moves along the reference mounting surface 215.

Therefore, the reversal takes place like that of the cassette tape 92 even when the recording is effected by using a double-side-stuck disk such as DVD-RAM or DVD-R/W described with reference to FIGS. 13 and 14 instead of using the cassette tape described earlier, and a discontinuing point occurs while passing over the coupling member 206.

When the second recording medium is the above-mentioned DVD-RAM instead of the cassette tape, the position where the reversal occurs can be judged, in advance, from the TOC of DVD-RAM and the TOC of CD. At a moment when the program needs the reversal, therefore, the CD and MD assume a pose and a REC pose, and the synchronous dubbing is continued after having waited for the reversal of the head.

This further holds when the record-possible time of the first recording surface of the DVD-RAM which is the second recording medium is shorter than the record-possible time of the MD 90 which is the third recording medium in dubbing the program reproduced from the CD which is the first recording medium into the DVD-RAM which is the second recording medium and into the MD 90 which is the third recording medium, simultaneously.

Therefore, the present invention becomes effective when the record-possible time of the third recording medium MD 90 is longer than the record-possible time of the first recording surface of the second recording medium DVD-RAM, and when the time for reproducing the program from the first recording medium CD 91 exceeds the record-possible time of the first recording surface of the second recording medium DVD-RAM.

Described below with reference to FIGS. 15 and 16 is a case where a disc-like recording medium having two or more layers of recording/reproducing surfaces is changed over for its recording surface.

FIG. 15 illustrates the operation for recording into a disc 220 having two layers of recording/reproducing surfaces. A base 225 that serves as the base of the disc is formed in a disc shape by using a member such as a polycarbonate. A first recording/reproducing layer 221 is formed on the base 225 and exhibits varying refractive index depending upon the data recorded by being irradiated with a light beam 223 from an optical head 224. A second recording/reproducing layer 222 is formed on the first recording/reproducing layer 221, and is more separated away from the base than the first recording/reproducing layer 221.

Here, the light beam 223 emitted from the optical head 224 at a position A is concentrated on the recording/reproducing surface of the first recording/reproducing layer 221. Here, the data-recording region of the first recording/reproducing layer 221 has no free space due to data that have been recorded already. In this case, the device for recording/reproducing the disc-like recording medium 220 controls the optical head 224 so that the optical beam 223 is concentrated onto the second recording surface as in a state B. The recording is interrupted while changing the focusing of light on the first recording layer 221 over to the focusing of light on the second recording layer 222.

In this state, the reproduction of the program from the first recording medium CD 91 is interrupted, the track to be recorded into the second recording medium MD 90 is changed over to another track and, after it is ready to record the data into the disk 220 which is the third recording medium, the program reproduced from the first recording medium CD 91 is rendered to be the program that had been reproduced just prior to the interruption, and is dubbed into the second recording medium MD 90 and into the third recording medium, i.e., into the disc 220 in synchronism.

When there is no free space in the first recording layer at a position C as shown in FIG. 16, the optical head 224 is conveyed to a position D that serves as a reference for recording and reproduction. Then, the data are dubbed in synchronism like in the case of FIG. 15, and the MD 90 is obtained without incompletely recorded program due to the same control operation as that of the case of FIG. 15.

It will be obvious that the disk 220 which is the third recording medium may be the one having two or more recording/reproducing layers and may be controlled in the same manner to obtain the MD 90 without the incompletely recorded program.

According to the recording/reproducing device and the recording/reproducing method of the present invention, the data from a recording medium for reproduction can be simultaneously dubbed into plural recording media including recording media that at least undergo reversal motion, without interrupting the record at the reversed portion or without recording incomplete track.

Having described preferred embodiments of the present invention with references to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A recording/reproducing device for recording a program recorded on a first recording medium onto a second recording medium having at least two recording regions and onto a third recording medium in parallel, comprising:

reproduction means for reproducing said program from said first recording medium;

first recording means for recording said program reproduced by said reproduction means onto said second recording medium;

second recording means for recording said program reproduced by said reproduction means onto said third recording medium;

detector means for detecting an occurrence of change-over of said recording from one said recording region onto another said recording region while said program reproduced by said recording medium;

conveyer means for conveying said reproduction means to a head part of said program being reproduced from said first recording medium;

eraser means for erasing a predetermined program recorded in said third recording medium; and control means for controlling said second recording means to cease recording said program onto said third recording medium when said detector means has detected said occurrence of change-over of said recording, for controlling said conveyer means to convey said reproduction means to said head part of said program of said first recording medium reproduced when said detector means has detected said occurrence of change-over of said program recording region of said second recording medium, for controlling said reproduction means, said first recording means and said second recording means to execute said recording in synchronism after said change-over from one said second recording medium has been completed, and for controlling said eraser means to erase said program recorded on said third recording medium immediately before said occurrence of change-over of said program recording region of said second recording medium.

2. The recording/reproducing device according to claim 1, wherein said third recording medium includes a management region storing management data for managing said recorded program, and said program is erased by editing said management data in said management region.

3. The recording/reproducing device according to claim 1, wherein said program recorded in said third recording medium immediately before said change-over in said recording detected by said detector means is erased by said erasing means when said third recording medium is removed from said second recording means of after said recording of said program has been completed.

4. The recording/reproducing device according to claim 1, wherein said program recorded in said third recording medium immediately before said change-over in said recording operation detected by said detector means is erased during said change-over in said recording.

5. The recording/reproducing device according to claim 1, wherein said second recording medium is a tape.

6. The recording/reproducing device according to claim 5, wherein said occurrence of change-over of said recording region onto said region on said second recording medium containing said program is detected by detecting a difference in a light transmission factor between a tape leader portion and a recording region.

7. The recording/reproducing device according to claim 5, wherein said occurrence of change-over of said recording region onto said region on said second recording medium containing said program is detected by detecting a change in tension of said tape.

8. The recording/reproducing device according to claim 1, wherein said second recording medium is a multi-layer disc.

9. The recording/reproducing device according to claim 8, wherein said second recording medium includes a management region onto which management data of said recording are recorded, and said occurrence of change-over of said recording from one said recording region into another said recording region of said second recording medium is detected based upon a state of a record-possible region used by said management data in said management region.

10. The recording/reproducing device according to claim 1, wherein said detector means comprises first detector means and further comprising:

second detector means for detecting silence in said program of said first recording medium reproduced by said reproduction means, wherein when a silent portion of said program is detected by said second detector means while said recording region containing said program is being changed over on said second recording medium as detected by said first detector means, said control means controls said reproduction means to continue said reproduction without causing said conveyer means to convey said reproduction means to said head of said program being reproduced.

11. A recording/reproducing method of copying a program reproduced from a first recording medium onto a second recording medium having at least two recording regions and into a third recording medium in parallel, comprising the steps of:

reproducing said program from said first recording medium, and recording said reproduced program onto said second recording medium and onto said third recording medium;

detecting an occurrence of change-over in said recording from one said recording region onto another said recording region while recording said program reproduced from said first recording medium onto said second recording medium;

halting said recording of said program onto said third recording medium when said occurrence of change-over in said recording is detected;

resuming said reproduction from a head part of said program of said first recording medium reproduced when said change-over in said recording was detected after said change-over of said recording onto said second recording medium has been completed, and simultaneously resuming said recording onto said second recording medium and said recording onto said third recording medium; and erasing said program recorded onto said third recording medium immediately before said detection of said change-over in said recording.

12. The recording/reproducing method according to claim 11, wherein said third recording medium includes a management region where management data are recorded for managing said recorded program, and said program is erased by editing said management data in said management region.

13. The recording/reproducing method according to claim 11, further comprising the step of:

detecting when said third recording medium is removed from said second recording means or when said recording of said program is completed, wherein said step of erasing said program recorded into said third recording medium immediately before said change-over in said recording is executed after said detection of said third recording means removal or of said completion of said recording of said program.

14. The recording/reproducing method according to claim 11, wherein said second recording medium is a tape.

15. The recording/reproducing method according to claim 14, wherein said occurrence of change-over in said recording is detected by detecting a difference in a light transmission factor between a tape leader portion and a recording region.

16. The recording/reproducing method according to claim 14, wherein said occurrence of change-over in said recording is detected by detecting a change in tension of said tape.

17. The recording/reproducing method according to claim 11, wherein said second recording medium is a multi-layer disc.

18. The recording/reproducing method according to claim 11, wherein said second recording medium includes a management region onto which management data are recorded for managing said recording region, and said occurrence of change-over of said recording is detected upon a state of a record-possible region of said second recording medium used by said management data in said management region of said second recording medium.

19. The recording/reproducing method according to claim 11, wherein:

said step of detecting said occurrence of change-over of said recording further detects silence in said program reproduced from said first recording medium;

after said step of detecting, a further step of detecting detects said occurrence of change-over of said recording and detects silence within said program reproduced from said first recording medium; and when said occurrence of change-over of said recording is detected and said silence is detected in said program reproduced from said first recording medium, said reproduction is continued without resuming said reproduction from said head part of said program being reproduced.

20. A recording/reproducing method of copying a program recorded in a first recording medium onto a second recording medium having at least two recording regions and into a third recording medium having a management region where management data are recorded for managing data recorded therein in parallel, comprising the steps of:

reproducing said program from said first recording medium, and recording said reproduced program onto said second recording medium and onto said third recording medium;

detecting an occurrence of change-over in said recording from one said recording region into another said recording region while recording said program reproduced from said first recording medium into said second recording medium;

halting said recording of said program onto said third recording medium and updating said management data in said management region of said third recording medium when said change-over in said recording is detected; and controlling said reproduction from a head part of said program of said first recording medium reproduced when said change-over in said recording was detected after said change-over of said recording onto said second recording medium has been completed, and controlling said recording of said program onto said second recording medium and onto said third recording medium in synchronism.

* * * * *